Nov. 21, 1961 — T. W. KNACKE — 3,009,673
PARACHUTE ASSEMBLY
Filed April 5, 1960 — 2 Sheets-Sheet 1

INVENTOR
THEODORE W. KNACKE
BY Keith D. Beecher
ATTORNEY

Nov. 21, 1961 T. W. KNACKE 3,009,673
PARACHUTE ASSEMBLY
Filed April 5, 1960 2 Sheets-Sheet 2

INVENTOR.
THEODORE W. KNACKE
BY
ATTORNEY

United States Patent Office 3,009,673
Patented Nov. 21, 1961

3,009,673
PARACHUTE ASSEMBLY
Theodore W. Knacke, Los Angeles, Calif., assignor to Space Recovery Systems, El Segundo, Calif., a corporation of Delaware
Filed Apr. 5, 1960, Ser. No. 20,147
4 Claims. (Cl. 244—147)

The present invention relates to parachute deployment, and it relates more particularly to an improved assembly for enabling a parachute to be deployed.

It is usual practice to use pilot parachutes as an aid in deploying parachutes in most applications. These applications may include, for example, man or cargo carrying parachutes, missile and other vehicle recoveries, and so on.

The main parachutes in the practice mentioned in the preceding paragraph are usually stowed in deployment bags. Such a deployment bag may hold all or part of the canopy of the main parachute. These deployment bags have assumed a variety of shapes and sizes in the prior art. For example, cylindrical, flat, conical and quarter deployment bags have been used successfully in the past. The deployment bag itself may be stowed, for example, in a container in the vehicle to be recovered.

In one type of prior art system, the pilot parachute is used to pull the deployment bag into a good airflow for the proper opening of the main parachute. In this type of prior art system the pilot parachute is ejected first. Such ejection is usually accomplished by spring loaded or pyrotechnic means. This means may be triggered by any appropriate aerodynamic means, timer, manually actuated, or other device. The pilot parachute is then allowed to inflate, and the inflated pilot parachute serves to pull the deployment bag out of its compartment.

In the prior art assemblies of the general type under discussion, the pilot parachute (or equivalent device) is usually connected to the deployment bag by means of bridle lines or risers. Then as the pilot parachute becomes inflated to pull the deployment bag out of its container, it then stretches the risers which act to deploy the suspension lines and canopy of the main parachute out of the deployment bag.

The above prior art type of assembly has been used successfully in the past. However, these assemblies have proven to be unduly costly and complicated due to the number and complexity of the parts involved.

For the larger types of vehicles to be recovered, parachute assemblies have been proposed in the prior art in which the main parachute itself, in its deployment bag, is ejected by pyrotechnic means out of the container. Then when the deployment bag and main parachute are in the air stream, the pilot chute is inflated and stretches the risers to deploy the suspension lines and canopy of the main parachute out of the deployment bag.

A disadvantage has been encountered in prior art assemblies of the latter general type. This particular disadvantage arises because the pilot parachute first tends to drag behind the deployment bag and retard its movement when the deployment bag is ejected from the container. This affects the trajectory of the deployment bag and produces a tendency for the main parachute to become fouled on the fins, tails, empannage or other protuberances of the aircraft, missile, or other carrier from which the main parachute is to be ejected.

The improved parachute assembly of the present invention is particularly suited for incorporation as the general type of assemply in which the main parachute and its deployment bag are ejected from a container in the vehicle by pyrotechnic means such as a mortar blast. However, it will become evident as the present description proceeds that the improved assembly of the invention has other applications. Indeed, the assembly of the invention will find general application wherever parachute fouling or tumbling is to be positively prevented.

In accordance with the concepts of the present invention, a pilot parachute is attached to a deployment bag for a main parachute in a manner such that the deployment bag and pilot parachute form a combined unit. In the embodiment of the invention to be described, for example, the pilot parachute is affixed to the deployment bag in a coaxial relationship with the rear end of the bag. The suspension lines for the canopy of the pilot parachute are attached to the bag at points near the front or middle of the bag and spaced around the bag.

An important advantage in the construction described in the preceding paragraph is that no interconnecting bridles are used between the pilot parachute and the deployment bag, and the pilot parachute is connected to the deployment bag in such a manner that the pilot parachute cannot drag behind the bag when the bag is first ejected from the container. A dome type canopy is preferably used for the pilot parachute, and the canopy may be flat, conical, hemispherical or any other suitable shape.

Further features and advantages of the invention will become apparent upon a consideration of the following specification when taken in conjunction with the accompanying drawings, in which.

Figure 1:
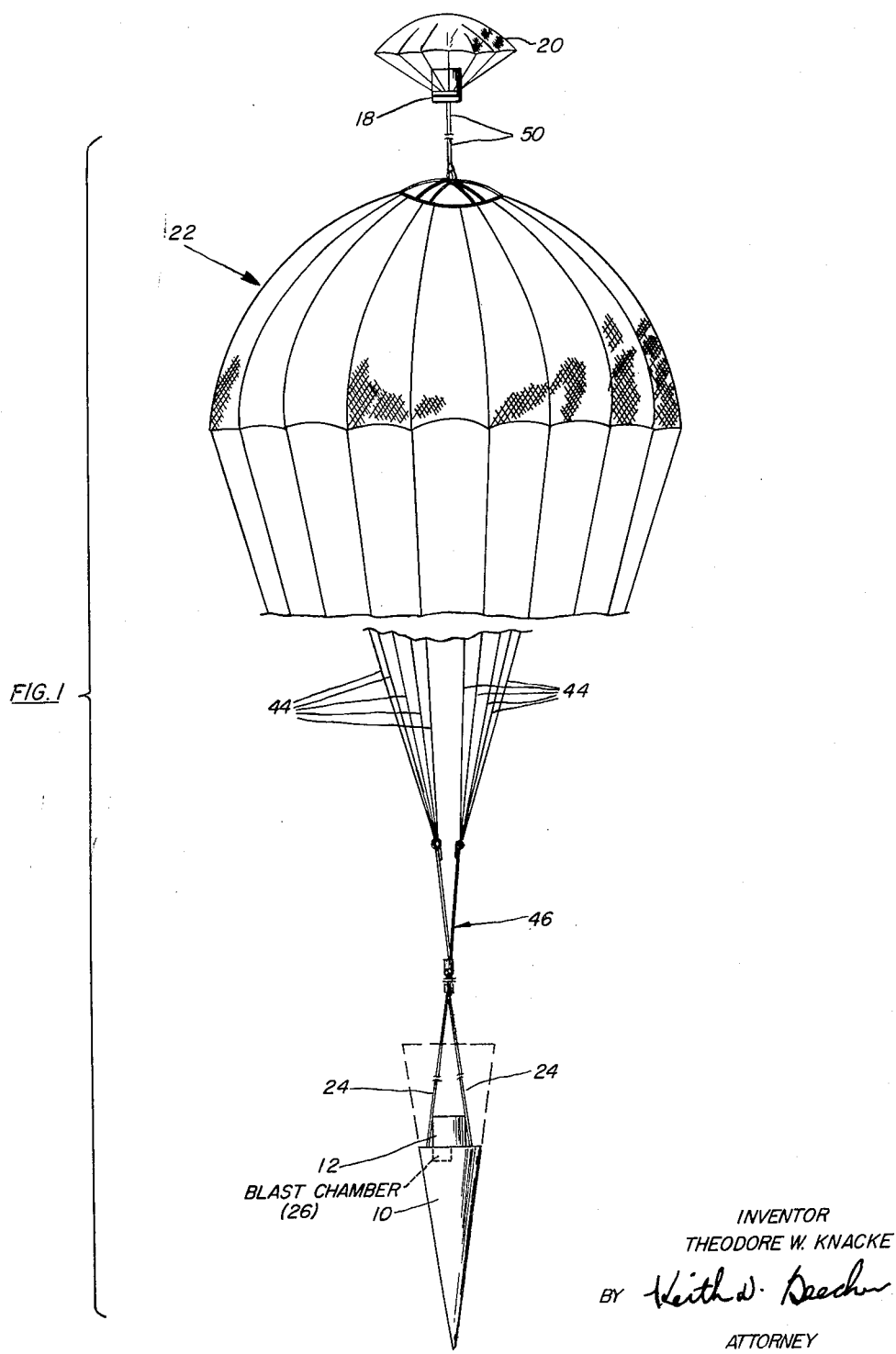
FIGURE 1 is a side elevational view of a vehicle to be recovered, together with the main parachute and the pilot parachute, both with their canopies in an inflated condition.

Reference will now be made to the drawings for a detailed description of one embodiment of the invention. The assembly illustrated in the accompanying drawings includes a vehicle to be recovered 10. This vehicle, as noted above, may be of many types. A typical example is the nose cone of a missile which may be separated from the body of the missile for recovery purposes.

A container 12 is mounted on the rear wall of the vehicle 10. This container normally includes a lid which encloses the end of the container remote from the vehicle 10, and which is usually fastened to the container by a plurality of shear pins.

A deployment bag 18 is housed in the container 12 before the vehicle 10 is released from the body of the missile. In accordance with the present invention, a pilot parachute 20 is secured directly to the deployment bag in a manner to be described. The deployment bag contains the main parachute 22. The main parachute is connected to the rear wall of the vehicle 10 by means including a pair of riser cables 24.

In accordance with usual practice, a blast chamber 26 is mounted on the rear wall of the vehicle 10 adjacent the container 12 and on the opposite side of the wall from the container. A conduit extends from the blast chamber into the container 12. A powder charge may be placed in the blast chamber 26, and a usual electrically actuated igniter may also be mounted in the blast chamber. The igniter may be actuated by a timer, barometric or temperature device, ground controlled signal, or any other particular control unit. When the igniter igniters the charge, the resulting blast passes through the conduit from the blast chamber into the rear of the container 12. This causes a pressure to be exerted on the deployment bag 18, and this pressure causes the deployment bag to be expelled at a high velocity through the other end of the container 12.

As mentioned above, it is most important that the pilot parachute does not have a tendency to drag behind the deployment bag as it is so expelled from the container. For should such a dragging action occur, the trajectory of the deployment bag is interfered with and there is a likelihood of the main parachute becoming fouled or of a tumbling action to take place.

The improved assembly of the present invention is particularly constructed to avoid the occurrences discussed in the preceding paragraph. The construction of one embodiment of the invention is shown, for example, in FIGURE 2.

Figure 2:
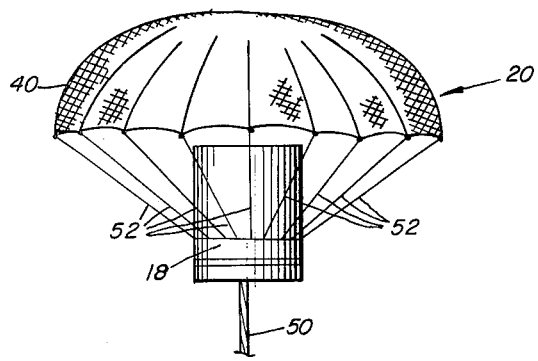
FIGURE 2 is a side elevational view of a deployment bag-pilot parachute deployment bag assembly constructed in accordance with one embodiment of the invention.

In the assembly of FIGURE 2, the canopy 40 of the pilot parachute 20 is supported directly on the deployment bag 18. This support is such that any transverse motion of the canopy 40 with respect to the longitudinal axis of the deployment bag 18 is constrained. This obviates any tendency for the pilot parachute 20 to drag as the deployment bag 18 is impelled backwards by the blast from the blast chamber. Instead, the canopy 40 is forced over the end of the deployment bag for such rearward motion of the bag and does not affect its trajectory.

As the deployment bag 18 is impelled rearwardly, the risers 24 become extended, as shown in FIGURE 1, and serve to draw the main parachute 22 out of the deployment bag. The risers 24 are formed into a riser cable assembly, and this cable assembly is secured to the suspension lines 44 by means of a link and sling assembly 46.

When the deployment bag reaches the end of its rearward travel and is moved forwardly and downwardly by the trajectory of the now falling vehicle 10, the assembly assumes the configuration of FIGURE 1. It will be observed from that view that both the main parachute 22 and the pilot parachute 20 are now inflated. The pilot parachute-deployment bag assembly are fastened to the main parachute 22 by means of a cable 50. As the vehicle 10 falls, the pilot parachute 20 exerts a tension on the cable 50 fully to draw the deployment bag 18 free of the main parachute 22 and to permit the latter to inflate. The cable 50 may be shearable, if so desired.

As shown in FIGURE 2, the pilot parachute 20 is mounted in a manner to surround the deployment bag 18. The canopy 40 is held in coaxial relationship with the longitudinal axis of the bag. This prevents the pilot parachute from looping away from that axis as the bag is impelled rearwardly, for the reasons explained.

The canopy 40 is held in place by a plurality of suspension lines 52. These suspension lines are fastened near the forward end of the bag 18 at equi-distantly spaced points around the periphery of that end.

Figure 3:
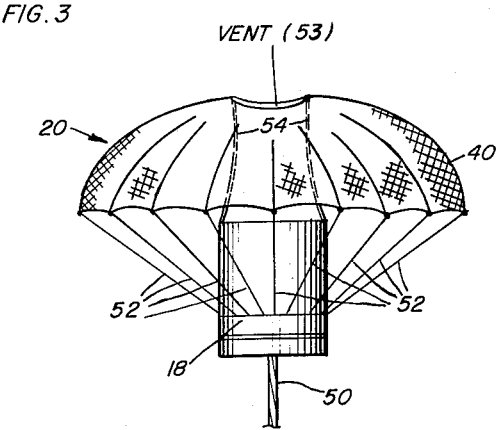
FIGURES 3 and 4 are respective side elevational views of deployment bag-pilot parachute assemblies constructed in accordance with further embodiments of the invention.

The embodiment of FIGURE 3 is similar to that of FIGURE 2, except that a vent 53 is provided in the canopy 40 in the latter embodiment. Anchor lines 54 may also be provided in the embodiment of FIGURE 3, these anchor lines extending from points inside the canopy 40 to equi-spaced points around the rear end of the bag.

In a constructed embodiment of the invention, eight suspension lines 52 were used, spaced equally around the bag 18. These lines 52 each had a length of 11½ inches. Four side anchor lines 54 were used, each of a length of 6 inches. Also, one 6 inch center anchor line (not shown) was used. The bag 18 in the constructed embodiment was cylindrical in shape. The bag had a diameter of 10 inches and a length of 11½ inches. These dimensions of the constructed embodiment, of course, are given merely by way of an illustrative example, and they are not to be construed as limiting the invention in any way.

Figure 4:
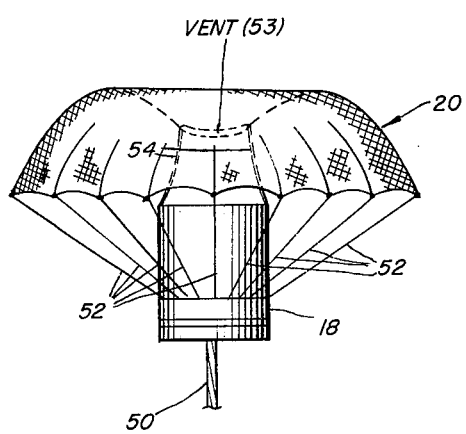

The embodiment of FIGURE 4 is similar to that of FIGURE 3, except that the anchor lines 54 in the latter embodiment serve to draw the canopy 40 into the illustrated configuration. This tends to cause the lower end of the canopy to expand radially outwardly so as to increase the drag of the pilot parachute.

The invention provides, therefore, an improved pilot parachute-deployment bag assembly which is conceived and constructed so that the bag may be discharged from the vehicle to be recovered along a desired trajectory path, and the bag is not diverted from that path by the pilot parachute. The improved assembly of the invention achieves this result by providing a construction in which any movement of the pilot parachute in a transverse direction with respect to the longitudinal axis of the deployment bag is constrained. This permits relatively large parachute units to be impelled by pyrotechnic means, for example, without any likelihood of the parachute tumbling or becoming fouled.

I claim:

1. In an assembly for housing and deploying a main parachute and the like and which includes: a body to be suspended from said main parachute, a deployment bag for said main parachute having a forward end through which the main parachute emerges and having a rear end, a container mounted on said body for housing said deployment bag, and ejecting means mounted on said body adjacent said container for ejecting said deployment bag from said container, the combination of a pilot parachute having a peripheral edge, and a plurality of suspension lines affixed to said peripheral edge of said pilot parachute at spaced positions around said edge and affixed to said bag at spaced positions around said bag and extending from said peripheral edge of said pilot parachute to said deployment bag to connect said pilot parachute to said deployment bag in coaxial relationship therewith so as to constrain transverse movement of said pilot parachute with respect to the longitudinal axis of said deployment bag as said deployment bag is ejected from said container.

2. In an assembly for housing and deploying a main parachute and the like, and which includes: a vehicle to be suspended from said main parachute, a deployment bag for said main parachute having a forward end through which said main parachute emerges and having a rear end, cable means attached to said rear end of said deployment bag and adapted to extend through said forward end thereof for coupling said deployment bag to said main parachute, a container mounted on said vehicle for housing said deployment bag, and a blast chamber mounted on said vehicle adjacent said container for ejecting said deployment bag from said container, the combination of a pilot parachute canopy having a peripheral edge, and a plurality of suspension lines attached to said peripheral edge of said canopy at spaced positions around said edge and to the forward end of said deployment bag at spaced positions around said forward end and extending from said canpoy to said deployment bag to connect said canopy to said deployment bag in coaxial relationship therewith so as to constrain transverse movement of said canopy with respect to the longitudinal axis of said deployment bag as said deployment bag is ejected from said container.

3. The assembly defined in claim 2 and which further includes a plurality of anchor lines affixed to said canopy and to the rear end of said deployment bag and extending from said canopy to said bag.

4. The assembly defined in claim 2 and which further includes a plurality of anchor lines affixed to said canopy and to the rear end of said bag and serving to draw the central portion of the canopy in towards the rear end of said deployment bag when said canopy is inflated so as to displace said peripheral edge of said canopy radially outward from said deployment bag.

References Cited in the file of this patent

UNITED STATES PATENTS

| 2,663,525 | Smith | Dec. 22, 1953 |
| 2,702,679 | Culver | Feb. 22, 1955 |
| 2,949,263 | Steinthol | Aug. 16, 1960 |

FOREIGN PATENTS

| 1,165,827 | France | June 9, 1958 |